US007553408B2

(12) United States Patent
Nystrom et al.

(10) Patent No.: US 7,553,408 B2
(45) Date of Patent: Jun. 30, 2009

(54) HYDRAULIC LUBRICATION FILTER CIRCUIT

(75) Inventors: Dwayne Alan Nystrom, Waterloo, IA (US); David Leo Sigl, Waterloo, IA (US); Brian Daniel Durbin, Waverly, IA (US); Scott E. Davison, Cedar Falls, IA (US); Reno Antonio Rodeghiero, Hudson, IA (US)

(73) Assignee: Deere & Company, Moline, IL (US)

( * ) Notice: Subject to any disclaimer, the term of this patent is extended or adjusted under 35 U.S.C. 154(b) by 694 days.

(21) Appl. No.: 11/369,352

(22) Filed: Mar. 7, 2006

(65) Prior Publication Data

US 2007/0209982 A1 Sep. 13, 2007

(51) Int. Cl.
*B01D 29/01* (2006.01)
*F15B 21/04* (2006.01)

(52) U.S. Cl. ............... 210/109; 210/167.05; 123/196 A

(58) Field of Classification Search ................ 210/109, 210/167.04, 167.05, 194, 195.1, 132; 123/196 A
See application file for complete search history.

(56) References Cited

U.S. PATENT DOCUMENTS

| | | | | |
|---|---|---|---|---|
| 5,614,090 | A | 3/1997 | Breusch | 210/232 |
| 5,660,726 | A | 8/1997 | Dluzik | 210/130 |
| 5,772,868 | A | 6/1998 | Reinhardt | 210/120 |
| 5,972,210 | A | 10/1999 | Münkel | 210/90 |
| 6,098,752 | A | 8/2000 | McCaleb | 184/1.5 |
| 6,461,262 | B2 | 10/2002 | Kashiwase | 474/28 |
| 6,790,348 | B2 | 9/2004 | Orborn | 210/172 |
| 6,932,902 | B2 * | 8/2005 | Hirasawa et al. | 210/167.04 |

* cited by examiner

*Primary Examiner*—Terry K Cecil

(57) ABSTRACT

A vehicle hydraulic system includes a lube circuit, a pump supplying hydraulic fluid from sump to first and a second hydraulic control circuits and a filter circuit. The filter circuit includes a first outlet connected to the lube circuit, a sump line, and a second outlet connected to the pump. A suction filter is connected between the sump line and second outlet. A return filter is connected to the first control circuit outlet. A return line having an orifice is connected between the return filter and the first outlet. A backpressure valve has a member, an outlet connected to the second outlet, and an inlet and pilot line connected to the return filter outlet. A pressure sense line has one end connected to the return line between the orifice and the first outlet, and a second end connected to the member in opposition to the pilot line.

7 Claims, 1 Drawing Sheet

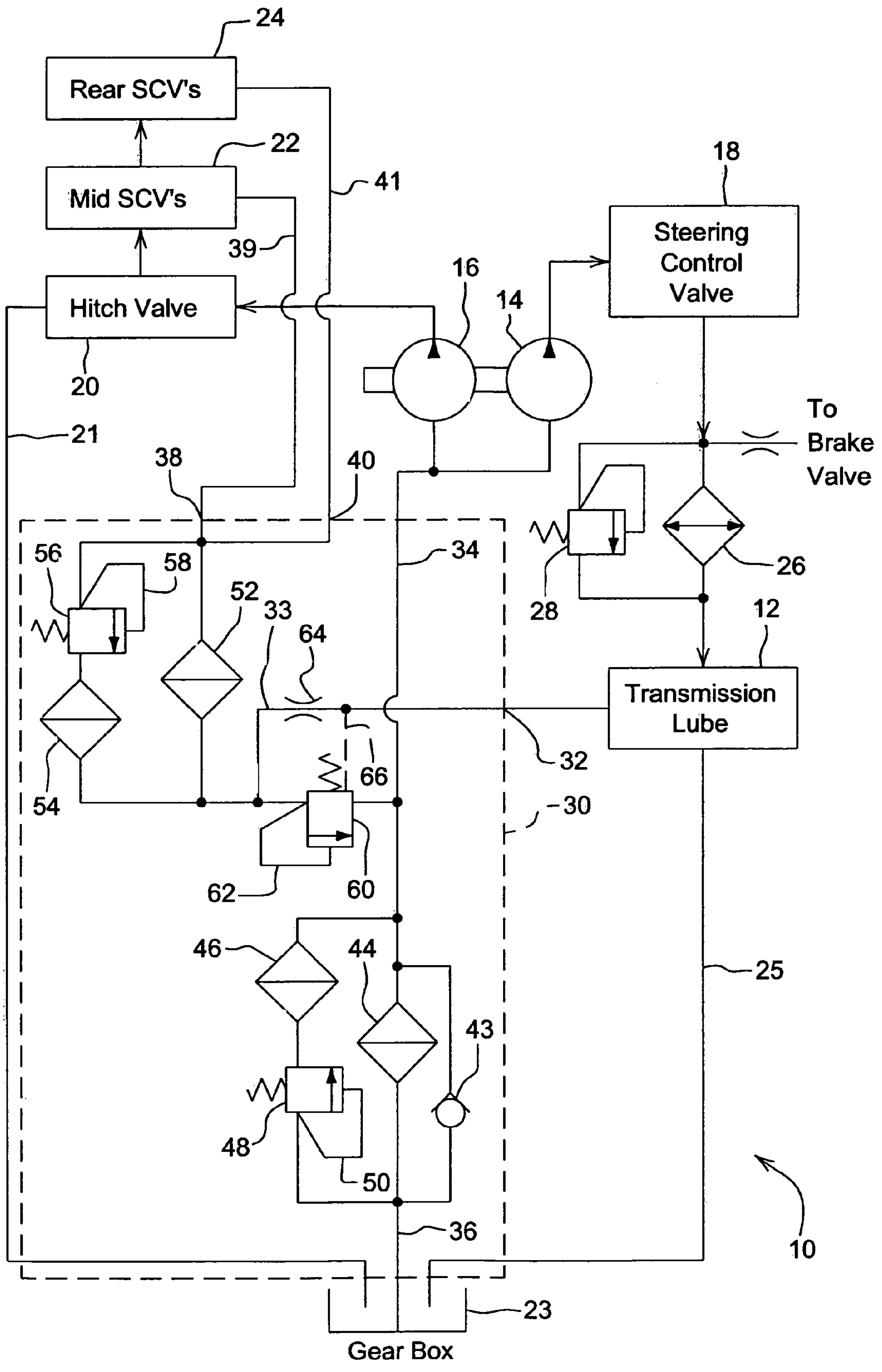
24
Rear SCV's
22
Mid SCV's
41
39
Hitch Valve
16
14
18
Steering
Control
Valve
20
21
To
Brake
Valve
38
40
34
56
58
52
33
64
28
26
12
Transmission
Lube
66
32
54
30
62
60
46
44
43
25
48
50
36
10
23
Gear Box

HYDRAULIC LUBRICATION FILTER CIRCUIT

BACKGROUND

The present invention relates to a filter circuit in a hydraulic lubrication system.

Agricultural tractors have hydraulic systems which include hydraulic pumps which supply pressurized hydraulic fluid to various hydraulically operated devices such as a steering system, a hitch system, selective control valves (SCVs) connected to hydraulic cylinders, and a transmission which includes hydraulically operated control valves and a hydraulic lubrication circuit. The SCVs have been located at different locations on the tractor, including middle and rear locations. For example, rear SCVs are connected by hydraulic couplers to hydraulic cylinders on an implement coupled to the tractor. The hydraulic pumps draw or suck hydraulic fluid from a sump or reservoir which may be formed by a housing such as a gear box housing.

Contaminants can be introduced into a hydraulic system at the implement hydraulic components, the couplers, and at other points.

SUMMARY

Accordingly, an object of this invention is to provide a filter system or circuit for protecting a vehicle hydraulic system from contaminants.

A further object of the invention is to provide such a filter circuit which protects a vehicle hydraulic system from contaminants.

These and other objects are achieved by the present invention, wherein a vehicle hydraulic system which has a component lube circuit, a pump supplying hydraulic fluid from a sump to a first and a second hydraulic control circuit includes a filter circuit. The filter circuit includes a first filter circuit outlet connected to a inlet of the lube circuit, a sump line connected to the sump, and a second filter circuit outlet connected to an inlet of the pump. A suction filter is connected between the sump line and the second filter circuit outlet. A suction bypass filter is connected in series with a suction bypass valve between the sump line and the second filter circuit outlet. A return filter is connected to an outlet of the first control circuit. A return line is connected between the return filter and the first filter circuit outlet. A return bypass filter is connected in series with a return bypass valve between an outlet of the first control circuit and the return line. A pressure responsive backpressure valve has an outlet connected to the second filter circuit outlet, and has an inlet and a pressure sensing pilot line both connected to an outlet of the return filter. The backpressure valve also has a valve member biased by a spring to a normally closed position and movable to an open position in response to pressure in the pilot line. An orifice is located in the return line. A pressure sense line has one end connected to the return line between the orifice and the first filter circuit outlet, and has a second end connected to the valve member in opposition to the pilot line.

BRIEF DESCRIPTION OF THE DRAWINGS

The sole FIGURE is a simplified schematic diagram of a vehicle hydraulic system including a filter circuit according to the present invention.

DETAILED DESCRIPTION

Referring to the FIGURE, a vehicle hydraulic system 10 includes a component lube circuit 12, such as the lube circuit for the vehicle transmission (not shown). The system includes a low capacity hydraulic pump 14 and a high capacity hydraulic pump 16. The pumps 14 and 16 could be either gear pumps or axial piston pumps. The low capacity pump 14 supplies pressurized hydraulic fluid to a hydraulic control unit 18, such as steering control valve. The high capacity pump 16 supplies pressurized hydraulic fluid to one or more control valve units, such as hitch control valve unit 20, a mid selective control valve (SCV) unit 22 and a rear SCV unit 24. Control valve units 20-24 are preferable connected in series. Hitch control valve unit 20 controls a tractor hitch cylinder (not shown). Mid SCV unit 22 and the rear SCV unit 24 may be connected by a conventional hydraulic coupler (not shown) to a cylinder (not shown) on an implement (not shown).

Hydraulic fluid is preferably communicated from the steering control valve 18 to the lube circuit 12 via cooler 26 and a cooler bypass valve 28. Bypass valve 28 is spring biased to a closed position and is urged to an open position by a pilot line connected to its inlet. A sump line 21 communicates hitch control valve 20 to a sump 23, such as a gear box sump. A sump line 25 communicates lube circuit 12 to the sump 23.

The hydraulic system 10 includes a filter circuit 30. Filter circuit 30 has a first filter circuit outlet 32 connected to an inlet of lube circuit 12 via a return line 33, and a second filter circuit outlet 34 connected to the inlets of pumps 14 and 16. Filter circuit 30 has a sump line 36 connected to sump 23. Filter circuit 30 also has a first inlet 38 connected to an outlet of mid SCV unit 22 via line 39, and a second inlet 40 connected to an outlet of rear SCV unit 24 via line 41.

Filter circuit 30 includes a suction filter or screen 44 between the sump line 36 and the second filter circuit outlet 34. A suction bypass strainer or loose filter or screen 46 is connected in series with a suction bypass valve 48 between the sump line 36 and the second filter circuit outlet 34. Valve 48 is spring biased to a closed position and is urged to an open position by a pilot line 50 connected to the sump line 36. A back-flow check valve 43 is connected in parallel with filter 44.

A return filter or screen 52 is connected between first outlet 32 and the inlets 38 and 40. A return bypass strainer or loose filter or screen 54 is connected in series with a return bypass valve 56 between first outlet 32 and the inlets 38 and 40 (in parallel with return filter 52). Valve 56 is spring biased to a closed position and is urged to an open position by a sense or pilot line 58 connected to inlets 38 and 40.

A pressure responsive backpressure valve 60 has an outlet connected to the second filter circuit outlet 34, an inlet connected to filter 52 and strainer 54 and to return line 33, and to a pressure sensing pilot line 62. Valve 60 is spring biased to a normally closed position and movable to an open position in response to pressure in the pilot line 62. Return line 33 includes an orifice or restriction 64 therein. A pressure sense line 66 has one end connected to the return line 33 between the orifice 64 and the first filter circuit outlet 32, and a second end connected to the valve member of valve 60 in opposition to the pilot line 62.

With this circuit filter 44 normally filters fluid drawn by the pumps 14 and 16 from the sump 23. When filter 44 becomes clogged, suction bypass valve 48 opens and bypass filter 46 filters fluid drawn by the pumps 14 and 16 from the sump 23.

Filter 52 normally filters fluid returning from SCVs 22 and 24. When filter 52 becomes clogged, return bypass valve 56 opens and bypass filter 54 filters fluid returning from SCVs 22 and 24. Fluid from filters 52 and 54 normally flows through line 33, orifice 64 and outlet 32 to transmission lube circuit 12.

Orifice 64, pilot line 62, sense line 66 cause valve 60 to regulate flow to and assure lube circuit 12 receives the desired amount of flow. Excess return flow not needed by lube circuit 12 gets directed to the inlet of pumps 14 and 16. This assures and adequate supply of hydraulic fluid to the pumps 14 and 16.

While the present invention has been described in conjunction with a specific embodiment, it is understood that many alternatives, modifications and variations will be apparent to those skilled in the art in light of the foregoing description. For example, the invention can be implement with either filters or screens, and the term filter in the claims below is intended to be a generic term meaning either a filter or a screen. Accordingly, this invention is intended to embrace all such alternatives, modifications and variations which fall within the spirit and scope of the appended claims.

We claim:

1. In a vehicle hydraulic system having a component lube circuit, a pump supplying hydraulic fluid from a sump to a first and a second hydraulic control circuit, a filter circuit comprising:

a first filter circuit outlet connected to a inlet of the lube circuit;

a sump line connected to the sump;

a second filter circuit outlet connected to an inlet of the pump;

a suction filter between the sump line and the second filter circuit outlet;

a suction bypass filter connected in series with a suction bypass valve between the sump line and the second filter circuit outlet;

a return filter connected to an outlet of the first control circuit;

a return line connected between the return filter and the first filter circuit outlet;

a return bypass filter connected in series with a return bypass valve between an outlet of the first control circuit and the return line;

a pressure responsive backpressure valve having an outlet connected to the second filter circuit outlet, having an inlet and a pressure sensing pilot line both connected to an outlet of the return filter, and having a valve member biased by a spring to a normally closed position and movable to an open position in response to pressure in the pilot line; and an orifice in the return line; and a pressure sense line having one end connected to the return line between the orifice and the first filter circuit outlet, and having a second end connected to the valve member in opposition to the pilot line.

2. The filter circuit of claim 1, wherein:

the suction bypass valve comprises an inlet connected to the sump line, an outlet connected to the suction bypass filter, a pilot line connected to the sump line, and a valve member spring biased to a closed position and movable to an open position in response to pressure in the sump line.

3. The filter circuit of claim 1, wherein:

the return bypass valve comprises an inlet connected to an outlet of the second lube circuit, an outlet connected to the return line, a pilot line connected to the outlet of the second lube circuit, and a valve member spring biased to a closed position and movable to an open position in response to pressure in the outlet of the second lube circuit.

4. The filter circuit of claim 1, further comprising:

a suction check valve connected in parallel with the suction filter, the suction check valve permitting one-way fluid flow to the sump.

5. The filter circuit of claim 1, wherein:

the first lube circuit comprises a transmission lube circuit.

6. In a vehicle hydraulic system having a component lube circuit, a pump supplying hydraulic fluid from a sump to a first and a second hydraulic control circuit, a filter circuit comprising:

a first filter circuit outlet connected to a inlet of the lube circuit;

a sump line connected to the sump;

a second filter circuit outlet connected to an inlet of the pump;

a suction filter between the sump line and the second filter circuit outlet;

a return filter connected to an outlet of the first control circuit;

a return line connected between the return filter and the first filter circuit outlet;

a pressure responsive backpressure valve having an outlet connected to the second filter circuit outlet, having an inlet and a pressure sensing pilot line both connected to an outlet of the return filter, and having a valve member biased by a spring to a normally closed position and movable to an open position in response to pressure in the pilot line; and an orifice in the return line; and a pressure sense line having one end connected to the return line between the orifice and the first filter circuit outlet, and having a second end connected to the valve member in opposition to the pilot line.

7. The filter circuit of claim 1, further comprising:

a suction bypass filter connected in series with a suction bypass valve between the sump line and the second filter circuit outlet; and a return bypass filter connected in series with a return bypass valve between an outlet of the first control circuit and the return line.

* * * * *